Aug. 11, 1964  M. RABER ETAL  3,144,393
SUBCOOLED LIQUID INLET FOG COOLED NUCLEAR REACTORS
Filed Oct. 29, 1962  3 Sheets-Sheet 1

INVENTOR.
MARVIN RABER
GEORGE A. SOFER
BY
Roland G. Anderson
ATTORNEY

Aug. 11, 1964 M. RABER ET AL 3,144,393
SUBCOOLED LIQUID INLET FOG COOLED NUCLEAR REACTORS
Filed Oct. 29, 1962 3 Sheets-Sheet 2

*INVENTOR.*
MARVIN RABER
GEORGE A. SOFER
BY
Roland G. Anderson
*ATTORNEY*

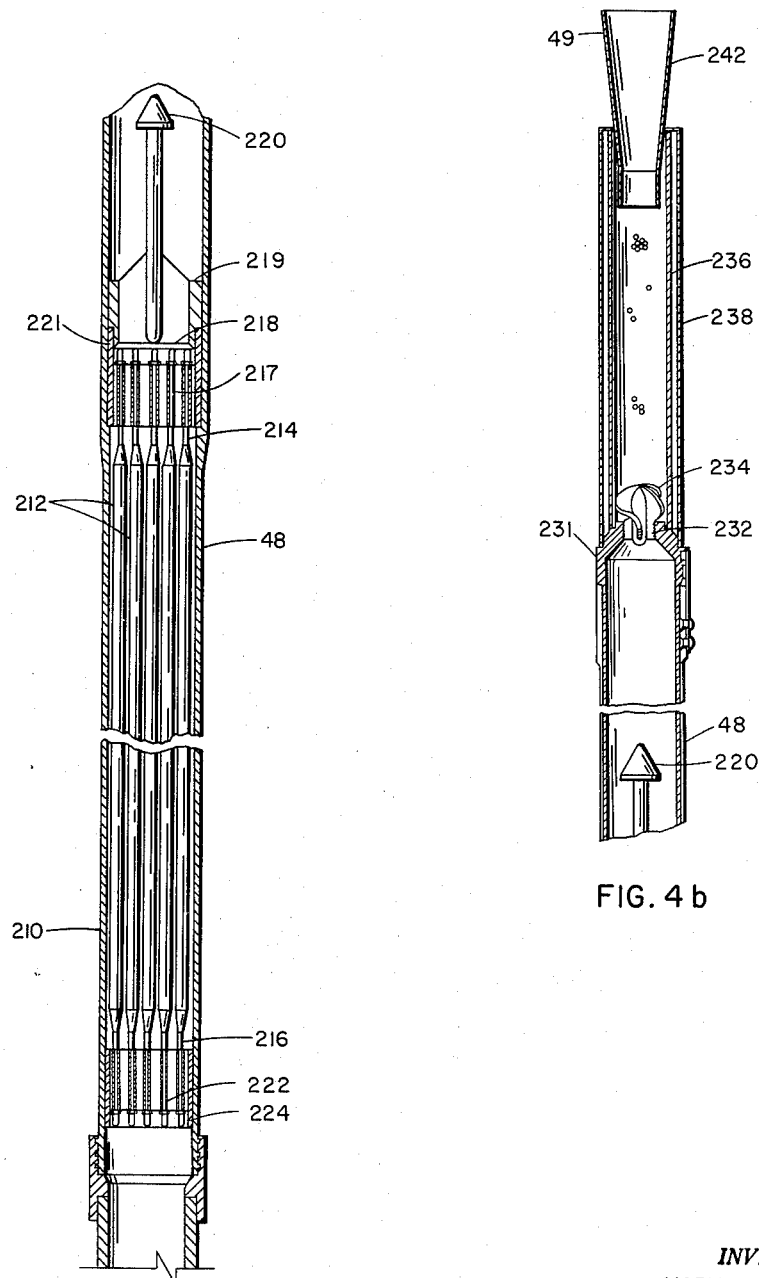

3,144,393
SUBCOOLED LIQUID INLET FOG COOLED NUCLEAR REACTORS

Marvin Raber, Yonkers, and George A. Sofer, White Plains, N.Y., assignors to the United States of America as represented by the United States Atomic Energy Commission
Filed Oct. 29, 1962, Ser. No. 233,985
3 Claims. (Cl. 176—54)

The present invention concerns a fog-cooled nuclear reactor and more particularly a fog-cooled nuclear reactor with subcooled liquid inlet to the core.

In a fog-cooled nuclear fission reactor, two phase flow of the coolant is utilized in the core for cooling and some moderation, just as in a boiling water reactor. However, the fog-cooled nuclear reactor differs from the boiling water reactor in that in the boiling water reactor a higher proportion of the water in the core serves as a coolant, which results in a reduced quality steam leaving the core, whereas in the fog-cooled reactor a smaller portion of the fluid passes through the core coolant channels containing the fuel with the result that a higher quality steam exits from the core. As described in U.S. patent application S.N. 158,620, filed on December 11, 1961, in the names of Arthur J. Goldman et al., the fog-cooled reactor appears to have certain advantages over the boiling water reactor due to the low coolant density of the fog.

The fog-cooled nuclear reactor described in the forementioned patent application is one which has a quality inlet control by which is meant that water and steam are mixed at the entrance to the coolant channels. In that arrangement there are certain inefficiencies arising as a result of the need for steam re-circulation pump, associated turbine drives, and a more complicated pressure vessel design, including the fog mixing nozzles and necessary increases in the requirements of the plant auxiliary power system.

In order to retain the various substantial advantages of the fog-cooled reactor and at the same time eliminate the inefficiencies associated with the additional costs of the quality inlet control we have devised a modified fog-cooled reactor in which coolant flow is separated from the moderator flow and no quality control at the inlet to the core is provided. In this arrangement, subcooled water is supplied to the core coolant channels as in a boiling water reactor, but the ratio of water supplied to the coolant channels to that which passes around and through the core as moderation fluid is that associated with the fog-cooled concept. Further, coolant qualities and mass velocities are sufficiently high to be in the fog flow regime over most of the core height. For example, the average quality of the two phase mixture exiting from the top of the coolant channels in the instant reactor is fifteen percent or more, as compared to 10% or less for the boiling water reactor concept.

A summation of features which distinguish this reactor with subcooled liquid inlet from conventional boiling water reactors is as follows:

(1) Seperation of the coolant in the coolant tubes from the moderator water outside the coolant tubes is such that the bulk of moderation occurs in the water outside the coolant channels. The water from the moderator space is pumped through a loop external to the reactor vessel and returns to the coolant inlet plenum below the core from which it then flows into the coolant channels.

(2) There is a low volume ratio of coolant to moderator. Volumes of coolant to moderator ratio are in the range 0.5 to 1.0 while those of conventional boiling water reactors are above 1.5.

(3) Average coolant exit qualities are greater than 15%. The coolant exit qualities of conventional boiling water reactors are limited to values below 10%.

(4) Coolant mass velocities are greater than $1.5 \times 10^6$ lbs. per hr./ft.$^2$. Coolant mass velocities of conventional boiling water reactors are generally less than $1.0 \times 10^6$ lbs. per hr./ft.$^2$.

(5) Compact moisture separation devices are attached to each of the individual coolant channels to separate the vapor and liquid. The vapor quality is raised to about 99% by these devices. The remainder of the entrained moisture is removed by wire mesh located inside the reactor vessel. In conventional boiling water reactors a steam drum outside the reactor vessel is used to remove the liquid from the vapor. The low coolant to moderator ratio of the invention leads to larger clearance between adjacent coolant channels, thereby facilitating the incorporation of moisture separators in individual coolant channels.

An important operational advantage of the fog-cooled reactor with subcooled liquid inlet over conventional boiling water reactors is the greatly reduced possibility of encountering combined nuclear and hydro-dynamic instabilities. At coolant mass velocities below $1.0 \times 10^6$ lb./hr.-ft.$^2$, associated with boiling water reactors, transition from bubble flow to slug or plug flow occurs as quality is increased. This flow regime is characterized by gross fluctuations in the vapor volume fraction. These fluctuations, combined with the strong dependence of reactivity on void content inherent in conventional boiling water reactors, tend to lead to unstable power oscillations. Coolant exit quality in the conventional boiling water reactors is thus limited to a relatively low value to prevent the occurrence of this unstable condition. With a low coolant-to-moderator volume ratio, however, it is possible to achieve high coolant mass velocities and direct transition to the more stable fog flow regime, and hence bypass the region of flow instability characteristic of slug and plug flow.

Nuclear calculations show that a fog-cooled reactor with subcooled liquid inlet would have negative void and power coefficients of reactivity (percent change in reactivity per percent change in core vapor volume fraction, and per percent change in reactor power level, respectively) about an order of magnitude smaller than those of conventional boiling reactors. These low reactivity coefficients further reduce the possibility of encountering unstable oscillations in power level.

This greater inherent stability of the fog-cooled reactor with liquid inlet results in significant savings in energy cost, as compared to conventional boiling reactors having a similar direct power plant cycle, by virtue of reduced cost of liquid recirculation pumps, piping, and valves, and reduced auxiliary power requirement of the plant. With conventional boiling reactor designs, stability considerations frequently necessitate the use of a dual power plant cycle rather than the simple, direct cycle. When compared with this type of plant, the economic advantage of the fog-cooled reactor with liquid inlet is even greater. Additional cost savings result from higher efficiency for a given reactor pressure, and lower capital costs because no secondary, low pressure steam generator and secondary steam loop to the turbine are required.

It is thus a first object of this invention to provide an improved fog-cooled nuclear reactor.

A further object of this invention is to provide a fog-cooled nuclear reactor with subcooled liquid inlet to the coolant channels.

Still another object of this invention is to provide a fog-cooled reactor with liquid inlet to the core and having an average coolant exit quality exceeding 15%.

Still another object of this invention is a fog-cooled reactor with liquid inlet to the core coolant channels in which low volume ratio of coolant to moderator is utilized in the core.

Still another object of this invention is a fog-cooled nuclear reactor with higher coolant mass velocities and separation of coolant and moderator by coolant channel tubes such that the bulk of moderation occurs in the spaces outside the coolant channels.

Other objects and advantages of this invention will hereinafter become more evident from the following description of a preferred embodiment of this invention taken with the reference to the accompanying drawings in which:

FIGS. 4a and 4b are detailed views in section of a typical fuel coolant tube.

Figure 1:
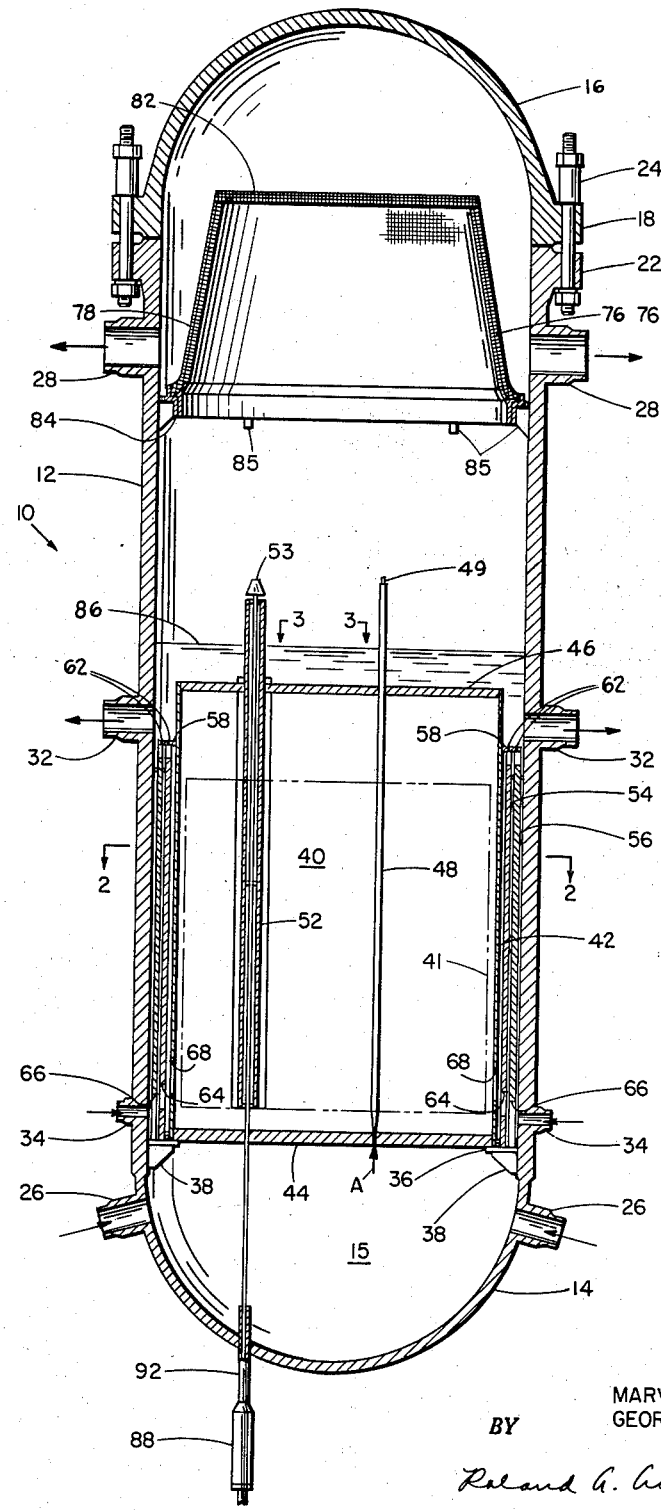
FIG. 1 is an elevation view in section of a nuclear reactor of the type herein described.
Figure 2:
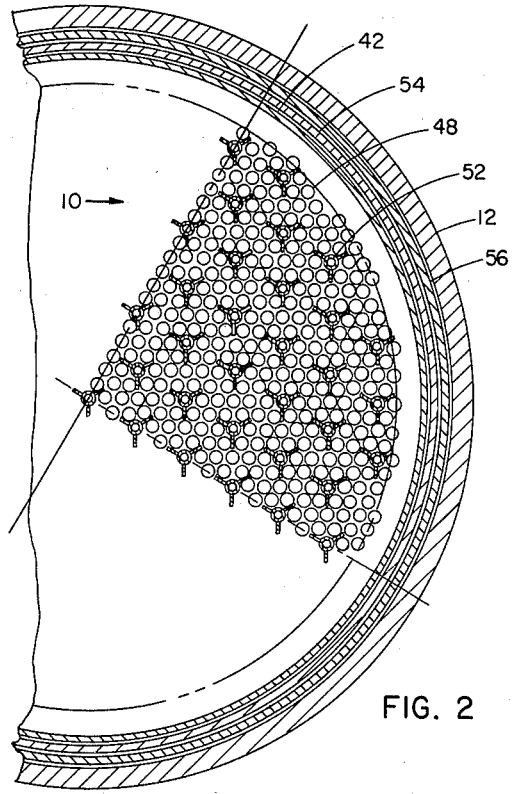
FIG. 2 is a view taken along 2—2 of FIG. 1.
Figure 3:
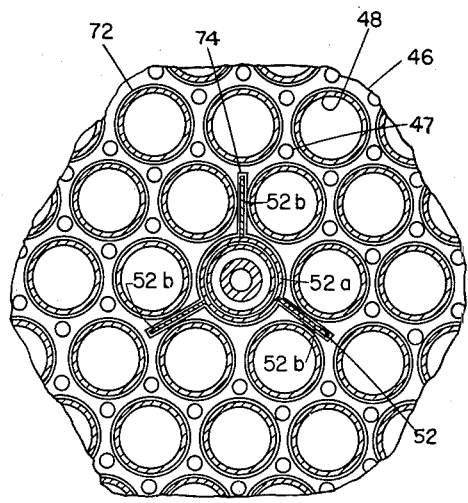
FIG. 3 is a detail of a view along 3—3 of FIG. 1.
Figure 5:
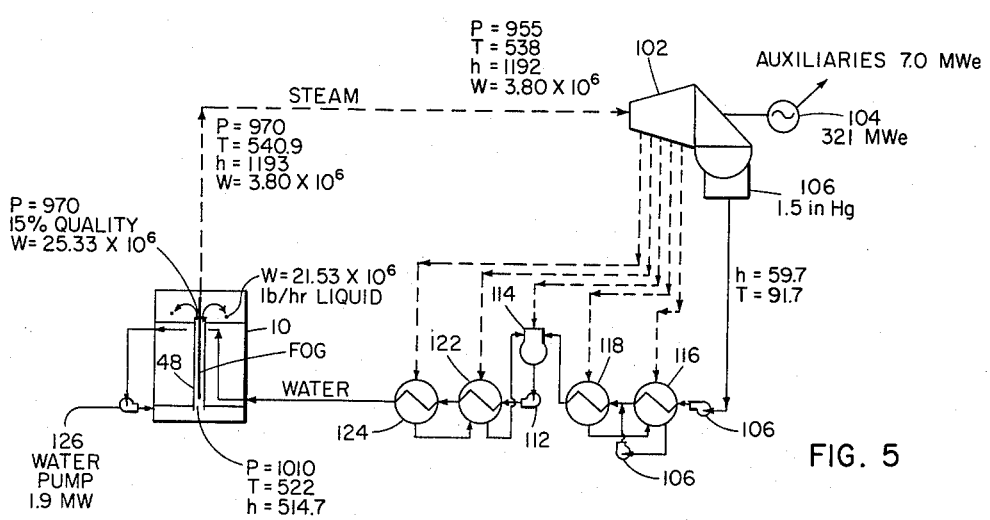
FIG. 5 is a diagram of a power generating system utilizing the fog-cooled reactor described herein.

Referring to FIGS. 1, 2, and 3 for a description of a preferred embodiment of this invention, there is illustrated a reactor 10 consisting of a cylindrical pressure vessel 12 having a bottom hemispherical section 14 and a cover 16. Cover 16 is provided with a flange 18 to engage with a flange 22 of vessel 12 so that a plurality of bolts 24 may be utilized to seal the top of reactor 10. Bottom section 14 of reactor vessel 12 is provided with a pair of water inlet nozzles 26. The side of pressure vessel 12 is provided with four dry steam outlets 28 just below flange 22, a pair of moderator water outlets 32 in the central region of pressure vessel 12, and four water moderator inlets 34 just above section 14.

Within pressure vessel 12 just below water inlet nozzles 34 is provided an annular shoulder 36 supported by plates 38. Shoulder 36 supports removable core unit or internals 40 which encloses the reactive core of reactor 10 indicated by phantom outline 41. Internals 40 consist of a core pull-out tube or cylinder 42 closed on the bottom by a circular tube sheet 44 and on the top by a solid circular grid plate 46. Shoulder 36 and plate 46 are attached to prevent water flow there between. Core unit 40 includes the fissional fuel elements of reactor 10 occupying region 41 of reactor core 40 and contained in coolant tubes or channels 48 arranged in configuration to form a critical array necessary for the nuclear fission reaction to occur as is now well understood in the art. Grid plate 46 and tube sheet 44 are provided with the openings necessary to accommodate a multiplicity of fuel coolant tubes 48 and control rods 52 which are utilized to control the nuclear fission reaction. For illustrative purposes only a single fuel coolant tube or channel 48 and a single control rod 52 are shown located in core unit 40 of reactor 10 of FIG. 1. Each control rod 52 is provided with a lifting knob 53 for a purpose to be later described. Each fuel coolant tube 48 has its own steam separator 49 at the exit thereof. A more detailed description of the fuel and control elements, not forming a part of this invention, will be given further below.

Surrounding pull-out cylinder 42 are a plurality of cylindrical thermal shields 54 and 56 which are supported by shoulder 36 as illustrated. An annular plate 58 having openings 62 extend out from core cylinder 42 to help support thermal shields 54 and 56 at the top. Thermal shields 54 and 56 are provided with openings 64 and 66, and pull-out cylinder 42 with openings 68, to permit water entering through nozzles 34 to fill up the spaces between these thermal shields and to enter into the interior of cylinder 42.

As best seen in FIGS. 2 and 3, core unit 40 contains a cluster of fuel coolant channels 48 with control rods 52 distributed throughout. Each of the latter consists of at least one hollow tube 52a with three wings 52b extending therefrom. Grid plate 46 is provided with a plurality of holes 47 to permit water flow there through and penetrations 72 and 74 to accommodate coolant channels 48 and control rods 52, respectively.

Referring back to FIG. 1, the upper portion of pressure vessel 12 is provided with a water separation device 76 which may consist of a frusto-conical shaped steel mesh 78 topped off by a circular steel mesh section 82 all supported on an annular support element 84 in turn supported by plates 85. The purpose of this arrangement is to separate further the water from the steam so that virtually perfectly dry steam leaving separator section 76 will pass out through nozzles 28.

The level of the water in reactor 12 is at 86 as illustrated. The movement of each control rod 52 is accomplished by a control rod mechanism 88 attached through a connecting rod sleeve 92 and rod 93 extending up through the bottom of reactor 10 to connect with control rod 52 illustrated. This arrangement permits unrestricted replacement of fuel and maintenance when cover 16 is removed. Rod 93 terminates at the top in lifting knob 53. Wings 52b extend to a point just above grid plate 46. The neutron absorbing or poison material in control rod 52 would be supported in wings 52b so that raising of control rod 52 would cause fewer neutrons to be absorbed and thereby to restrict less the fissioning process, as understood in the art.

FIGS. 4a and 4b illustrate the details of the fuel elements mounted within fuel coolant channels 48. Contained within each fuel coolant channel 48 is a cluster of rods 212 made from $UO_2$. Each of rods 212 is clad with a suitable stainless steel such as Zircaloy-2 tubing. The spacing between rods 212 is maintained by helical wires (not shown) wrapped around each fuel rod and welded to tube end caps 214 and 216 under controlled tension in the wire, as is understood in the art. The entire cluster of rods 212 is similarly wrapped by a wire (not shown) which serves to maintain the cluster of rods 212 centered within coolant tube 48. Fuel elements 212 are supported through upper fuel rod support assemblies 217 by an upper holding sleeve 219 and a lifting knob 220. Sleeve 219 is attached to a cylinder 221 resting on a shoulder 48a of channel 48. The bottom of fuel elements 212 are supported by lower fuel rod support assemblies 222 located within a removable sleeve 224. The liquid water coolant flows up through channels 48 withdrawing the heat from elements 212 and becoming partially vaporized to form fog as described.

The top of channel 48 terminates in a cap 231 having an opening 232 into which is threaded a spiral-vaned nozzle 234 to jet the fog out radially. Two or more perforated cylindrical screens 236 and 238 collect the moisture, while dry steam exits through a nozzle 242. The foregoing elements form the moisture separator 49 previously identified and which may be locked into place by any convenient means.

In the operation of reactor 10 water enters nozzles 34 to flow up around coolant channels 48, through control rods 52 filling up reactor 10 to level 86. This water acts predominantly as the moderator for the nuclear fuel within core unit 40 and is so identified as the moderator water. The water leaving nozzle 32 is then passed down into plenum 15 through nozzles 26 to enter the fuel coolant tubes 48 as indicated by arrows A. This water, which acts as and is identified as the coolant for reactor 10, becomes fog within channels 48 and passes up through fuel coolant channels 48 and out through steam separator 49. The steam is dried further by mesh 76 and the dry steam leaves nozzles 28 to be used in power generation or other apparatus.

It will be noted that moderator water entering through nozzles 34 fills up the spaces between thermal shields 54 and 56 enters core unit 40 through openings 66, 64 and 68 thereby filling up the spaces not only around core 40 but around coolant tubes 48 and around the control rods 52 and up to level 86 illustrated. Moderator water passes up through holes 47 in guide plate 46. It should be noted that within core unit 40 the moderator water is always separated from the coolant water flow.

Control over reactor 10 is exercised by control rods 52. The rod 52 shown in FIG. 1 is in its lowermost position (reactor shutdown). Mechanism 88 moves rod 52 up to permit operation and control of reactor 10. To remove rod 52, the latter is disconnected at mechanism 88 and is lifted by knob 52 and through the top of pressure vessel with cover 16 removed.

A power plant system embodying this reactor design is shown in FIG. 6 consisting of reactor 10, a steam turbine 102 with an auxiliary generator 104, condensor 106, feed water pumps 106, 108 and 112 and de-aerator 114. Also, there are the usual intercoolers 116, 118, 122 and 124. Steam is bled off at various stages of turbine 102 to be used in the intercoolers to supply the preheated feedwater as the inlet moderating water as illustrated schematically. The moderator leaving nozzles 32 in FIG. 1 is sent back through a pump 126 to plenum 15 through nozzles 26 to be used as the coolant in the channels 48 and to become the fog in reactor 10. Illustrated directly on FIG. 4 are the various parameters, temperatures, pressures and other conditions of flow for the specific embodiment illustrated and described.

More specific details of this particular reactor embodiment are shown in Tables I and II.

Table I

| | |
|---|---|
| Net power output, mw.$_e$ | 300 |
| Fuel element | [3] UO$_2$ |
| No. rods/cluster | 19 |
| Fuel meat diameter, in | 0.40 |
| Cladding: | |
|   Material | Zr-2 |
|   Thickness, in | 0.025 |
|   O.D., in | 0.45 |
| Ligament spacing, in | 0.050 |
| Shroud tube: | |
|   Material | Zr-2 |
|   Thickness, in | 0.050 |
|   I.D., in | 2.482 |
| Core height, ft | 11.55 |
| Core diameter, ft | 10.0 |
| Average coolant density, g./cm.$^3$: | |
|   Full power | 0.40 |
|   Zero power | 0.77 |
| Coolant pressure, p.s.i.a | 1000 |
| Moderator temperature, °F | 507 |
| Moderator-to-fuel ratio, $v_M/v_{UO_2}$ [1] | 1.3 |
| Fuel enrichment, a/o U$^{235}$ | 1.6 |
| Hot, clean parameters: | |
|   $f$ | 0.86 |
|   $p$ | 0.81 |
|   $\epsilon$ | 1.037 |
|   $\eta$ | 1.640 |
|   $k_\infty$ | 1.185 |
|   Leakage, percent | 2.2 |
|   $k_{eff}$ | 1.159 |
| F, thermal flux at cluster surface/average flux in fuel | 1.19 |
| Effects of coolant density on reactivity, $\Delta k/k$: | |
|   Cold flooded to hot flooded [2] | −0.008 |
|   Hot, flooded to full power | −0.005 |
|   Full power to 100% quality | −0.0055 |
|   Control requirement, $\Delta k/k$, percent | 17.8 |
|   Shutdown margin, $\Delta k/k$, percent | 3.0 |

[1] Does not include water inside the coolant channel.
[2] Includes Doppler effect and neutron temperature change.
[3] Rods in circular array.

Table II

| | |
|---|---|
| Power cycle conditions: | |
|   Total reactor power, mw.$_t$ | 968. |
|   Net electric power, mw.$_0$ | 314. |
|   Turbine throttle temp., °F | 538. |
|   Turbine throttle pressure, p.s.i.a | 955. |
|   Net plant efficiency, percent | 32.4 |
|   Total steam flow, lb./hr | 3.80×10$^6$. |
| Reactor description: | |
|   Active equivalent diam., ft | 10.0. |
|   Active height, ft | 11.55. |
| Lattice position (fueled): | |
|   Lattice arrangement | Hexagonal. |
|   Lattice spacing, in | 3.10. |
|   Total number of fuel lattice positions | 1250. |
|   Rods per cluster, number | 19. |
|   Coolant channel I.D., in | 2.482. |
|   Coolant channel wall thickness, in | 0.050. |
|   Coolant channel material | Zr-2. |
| Fuel element: | |
|   Fuel material | UO$_2$. |
|   Enrichment, a/o U$^{235}$ | 1.0. |
|   Fuel element geometry | Rod. |
|   Clad material | Zr-2. |
|   Clad thickness, in | 0.025. |
|   O.D., in | 0.45. |
|   Active length, ft | 11.55. |
| Reactor control: | |
|   Control method | Boron steel rods. |
|   Control rods, number | 109. |
|   Rod shape | Vertical tube with 3 longitudinal blades 120 apart, 2.1 in. wide. |
|   Effective length, ft | 11.55. |
|   Drive type | Electromechanical. |
| Performance data—Heat transfer and fluid flow: | |
|   Reactor coolant | Two-phase flow. |
|   Power to coolant, mw.$_t$ | 900. |
|   Coolant outlet temp., °F | 542. |
|   Coolant inlet subcooling (uniform), B.t.u./lb | 28.5. |
|   Coolant outlet quality, average percent | 15.0. |
|   Coolant outlet quality, maximum, (nominal conditions), percent | 22.4. |
|   Coolant inlet pressure, p.s.i.a | 1010. |
|   Coolant flow rate, lb./hr | 25.33×10$^6$. |
|   Maximum core coolant velocity, ft./sec. | 45. |
|   Average core heat flux, B.t.u./hr.-ft.$^2$ | 95,000. |
|   Maximum steady state core heat flux, B.t.u./hr.-ft.$^2$ | [1] 357,000. |
|   Maximum steady state fuel center temp., °F | [2] 4275. |
|   Maximum cladding surface temp., °F | 560. |
|   Min. heat flux burnout ratio | [3] >1.45. |
|   Min. enthalpy burnout ratio | >150. |
|   Maximum heat flux (including 15% power transient) at point of min. burnout ratio, B.t.u./hr.-ft.$^2$ | [3] 325,000. |
|   Burnout heat flux at point of min. burnout ratio, B.t.u./hr.-ft.$^2$ | [3] >470,000. |
|   Max. coolant mass velocity (nominal), lb./hr.-ft.$^2$ | 1.607×10$^6$. |
|   Average coolant mass velocity, lb./hr.-ft.$^2$ | 1.607×10$^6$. |
|   Average core power density, kw.$_t$/ft.$^3$ of core | 1070. |

See footnotes at end of table.

Table II—Continued

Peak to average power ratio (nominal) _____ 2.63.
Power to moderator, percent_____ 7.
Average moderator temp., °F____ [1] 515.
Core pressure drop, p.s.i_____ [4] ~40.

[1] Includes allowance for overall nuclear peaking factor of 3.13 (based on maximum axial peaking factor of 1.88) plus steady state hot spot factor of 1.20.
[2] Based on a $UO_2$ thermal conductivity of 1 B.t.u./hr. ft., °F.
[3] Includes allowance for appropriate nominal nuclear peaking plus an overall hot spot factor of 1.38. The burnout heat flux at the point of minimum burnout ratio corresponds to perturbed flow conditions in hottest channel as determined by the various hot spot and hot channel factors.
[4] Includes allowance for fuel element spacers and end plates.

In the reactor described a coolant-to-moderator volume ratio of less than about 0.7 is maintained as compared to about 1.9 for the Dresden reactor described in volume 1 of the "Directory of Nuclear Reactors," issued by the IAEA, published 1959. With the reduced coolant-to-moderator volume ratio it is possible to achieve high coolant mass velocities and hence to bypass the region of flow instability characteristic of slug and plug flow by direct transition to the more stable fog flow regime. Because of the relatively low coolant-to-moderator volume ratio, a given core void fraction would correspond to a much higher average vapor volume fraction in the coolant and the same void fraction in the conventional boiling water reactor. For a coolant-to-moderator volume ratio of 0.6 for example, an average core void fraction would be 0.09 which corresponds to an average vapor volume fraction more than three times greater than in the Dresden reactor. A given total amount of reactivity tied up in voids therefore would permit operation with much higher coolant exit qualities in a liquid inlet fog cooled reactor than in conventional boiling reactor designs. As a result, the reactor herein described permits coolant channel exit steam qualities of 15% or more.

It is thus seen that there has been provided a fog-cooled nuclear reactor in which exit qualities of at least 15% and more may be obtained and employing reduced coolant-to-moderator volume ratios. The reactor is one in which the coolant mass velocity is held at a relatively high value permitting a direct transition from bubble flow to fog flow without crossing the slug flow regime. Thus the exit quality is appreciably higher than those of present boiling water reactor designs and hence a significant reduction in water recirculation rate is achieved with the result that substantial savings in auxiliary circulation equipment and capital equipment are effected. As indicated in the preliminary characteristics of this reactor plant given in the tables above a potential power generation cost reduction of 0.15 to 0.3 mil per kw.-hr. is estimated for this reactor plant over a single direct cycle boiling water reactor.

It is thus seen that a novel fog cooled reactor has been provided. While only a preferred embodiment of this invention has been described it is understood that the invention may have many variations thereof without departing from the scope or the principles of this invention as defined in the accompanying claims.

We claim:
1. A fog-cooled nuclear reactor comprising a pressure vessel, removable core means mounted within said vessel, a lower plenum formed within and by said pressure vessel below said core means, an upper plenum formed within and by said pressure vessel above said core means, spaced fuel coolant channels extending through said core means, said channels each having an opening into said lower plenum and an opening into said upper plenum, said channels containing the fissionable fuel elements of said reactor, moderator inlet means for delivering moderator water into and around said core means for filling the spaces between said coolant channels, said spaced fuel coolant channels being of such size relative to said core that the ratio of the volume of said coolant passages to said spaces between said coolant channels are in the range of 0.5 to 1.0, means for causing said coolant to flow through said fuel coolant channels at mass velocities greater than $1.5 \times 10^6$ lbs. per hr./ft.$^2$ whereby said coolant water becomes partially vaporized in said coolant channels to form fog, means in said upper plenum for separating said fog into steam and water, and means for withdrawing said steam from said vessel.

2. A fog-cooled nuclear reactor comprising a pressure vessel, removal core means mounted within said vessel, a lower plenum formed within and by said pressure vessel below said core means, an upper plenum formed within and by said pressure vessel above said core means, spaced fuel coolant channels extending through said core means, said channels each having an opening into said lower plenum and an opening into said upper plenum, said channels containing the fissionable fuel elements of said reactor, means for substantially preventing flow between said lower plenum and the inside of said core means except through said channels, moderator inlet means for delivering moderator water into and around said core means for filling the spaces between said coolant channels, said spaced fuel coolant channels being of such size relative to said core that the ratio of the volume of said coolant passages to said spaces between said coolant channels are in the range of 0.5 to 1.0, means for causing said coolant to flow through said fuel coolant channels at mass velocities greater than $1.5 \times 10^6$ lbs. per hr./ft.$^2$ whereby said coolant water becomes partially vaporized in said coolant channels to form fog, means at the outlet of each said coolant channel to separate said fog into steam and water, means for withdrawing said steam from said vessel and means for withdrawing water circulated as moderator and coolant from said reactor.

3. The fog-cooled reactor of claim 2 including a second separating means located between the outlets of said coolant channels and said steam withdrawing means, and wherein said means at the outlet of each said coolant channel comprises a spiral-vaned nozzle to jet the fog out radially, a cylindrical perforated screen surrounding and extending upwardly from said nozzle to collect water, and a nozzle at the upper end of said screen to direct steam toward said second separating means.

References Cited in the file of this patent

UNITED STATES PATENTS

| | | |
|---|---|---|
| 3,036,965 | Braun | May 29, 1962 |
| 3,041,264 | Ricard | June 26, 1962 |
| 3,042,595 | Cobb et al. | July 3, 1962 |
| 3,077,443 | Comack et al. | Feb. 12, 1963 |
| 3,098,812 | Treshow | July 23, 1963 |

FOREIGN PATENTS

| | | |
|---|---|---|
| 799,725 | Great Britain | Aug. 13, 1958 |
| 884,498 | Great Britain | Dec. 12, 1961 |

OTHER REFERENCES

"Heavy Water Reactors Cooled with Light Water-Vapor Mixtures," M. Silvestri.

"Fog Coolant Technology and Its Application to Nuclear Reactors," George Sofer, June 4–7, 1962, "Nuclear Congress," Engineers Joint Council.